US006886036B1

United States Patent
Santamäki et al.

(10) Patent No.: US 6,886,036 B1
(45) Date of Patent: Apr. 26, 2005

(54) SYSTEM AND METHOD FOR ENHANCED DATA ACCESS EFFICIENCY USING AN ELECTRONIC BOOK OVER DATA NETWORKS

(75) Inventors: Harry Santamäki, Helsinki (FI); Marko Vänskä, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/432,069

(22) Filed: Nov. 2, 1999

(51) Int. Cl.[7] .............................................. G06F 15/173
(52) U.S. Cl. ......................... 709/223; 709/203; 707/3; 707/4
(58) Field of Search .............................. 709/203, 223; 707/3, 4, 2, 513, 526, 500; 701/2

(56) References Cited

U.S. PATENT DOCUMENTS

| 5,893,132 | A |   | 4/1999  | Huffman et al. |
|-----------|---|---|---------|----------------|
| 5,986,690 | A | * | 11/1999 | Hendricks ..................... 725/60 |
| 6,185,684 | B1 | * | 2/2001 | Pravetz et al. .............. 713/182 |
| 6,331,865 | B1 | * | 12/2001 | Sachs et al. ................ 345/776 |
| 6,336,074 | B1 | * | 1/2002 | Woo ............................ 701/208 |
| 6,415,278 | B1 | * | 7/2002 | Sweet et al. ..................... 707/2 |
| 6,415,294 | B1 | * | 7/2002 | Niemi ........................ 707/102 |
| 6,493,734 | B1 | * | 12/2002 | Sachs et al. ................. 715/526 |
| 6,546,406 | B1 | * | 4/2003 | DeRose et al. ............. 707/513 |
| 6,560,645 | B1 | * | 5/2003 | Igawa et al. ................ 709/223 |

FOREIGN PATENT DOCUMENTS

WO 98/08344 8/1997

* cited by examiner

Primary Examiner—John Follansbee
Assistant Examiner—Jinsong Hu
(74) Attorney, Agent, or Firm—Antonelli, Terry, Stout & Kraus, LLP

(57) ABSTRACT

An electronic book (e-book) system is disclosed for advancing distribution of electronic reading materials using an electronic book (e-book) server at different locations over different data networks. Such an electronic book system may comprise a private network; a central server connected to the private network, which stores a collection of electronic documents; an e-book server which stores an electronic document selected from the central server converted in an e-book format for later downloading to a remote e-book terminal, via a public network; and a host computer connected to the private network, which selects the electronic document from the central server, and uses a print function of an operating system to transfer the selected electronic document from the central server for storage in an e-book format at the e-book server for later downloading to a remote e-book terminal, via the public network.

28 Claims, 8 Drawing Sheets

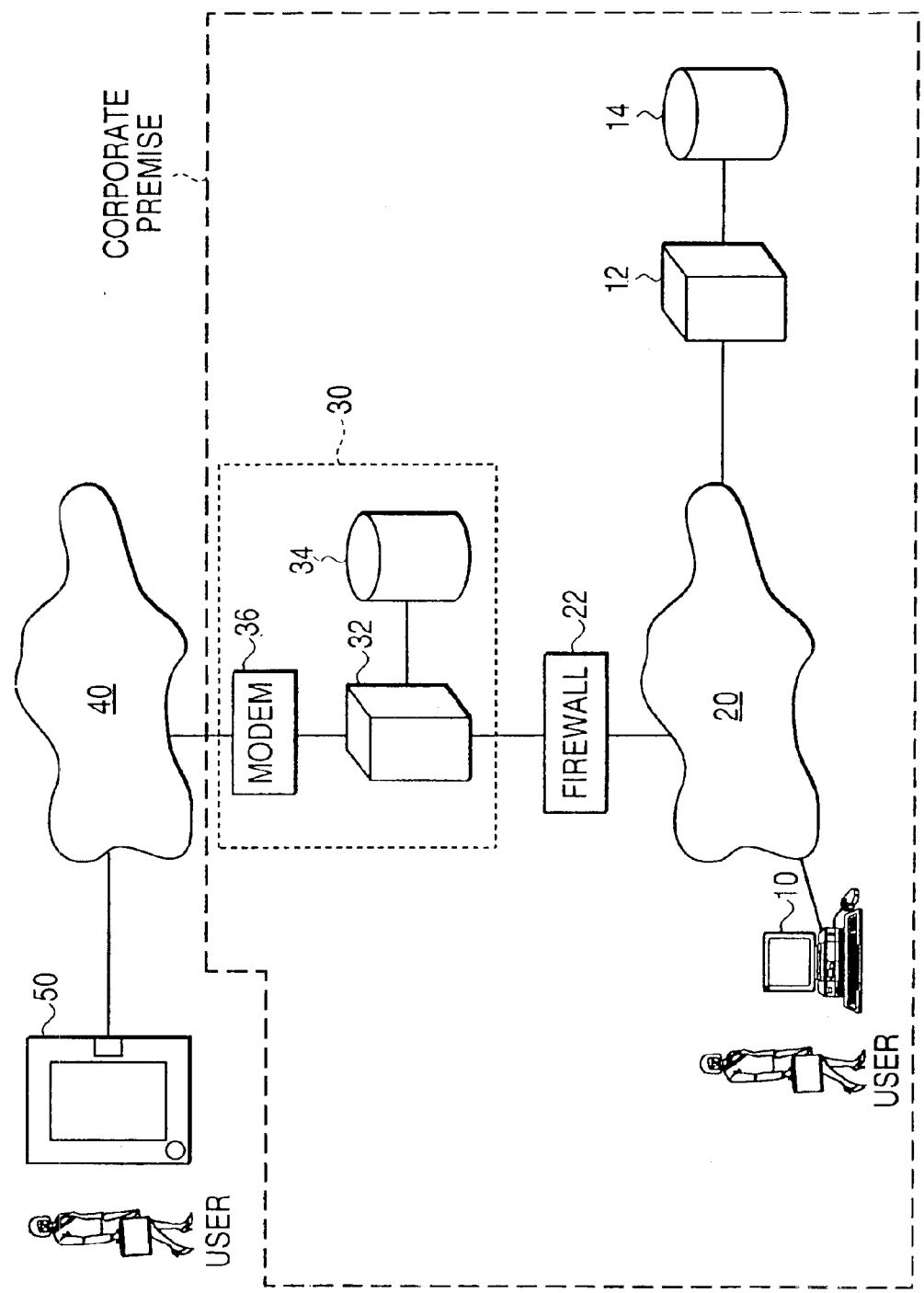

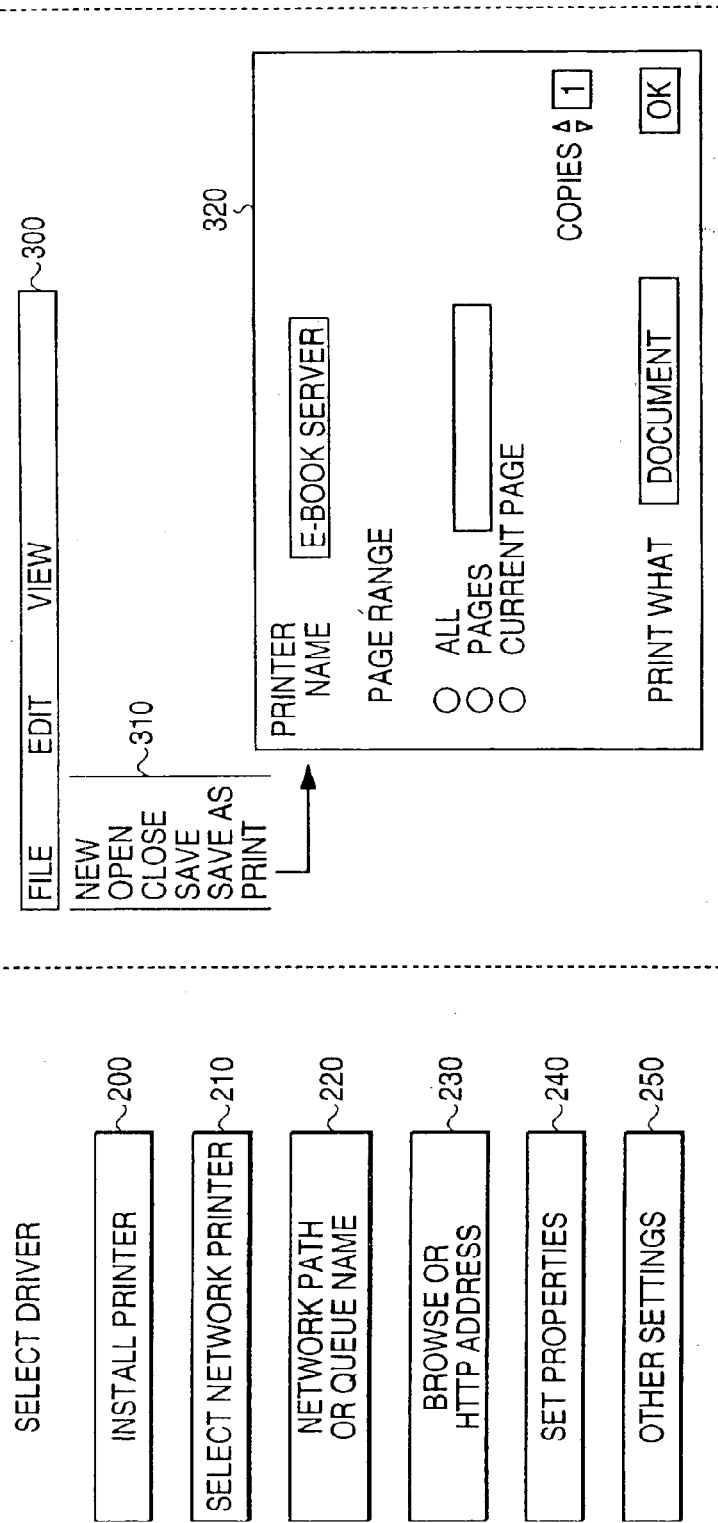
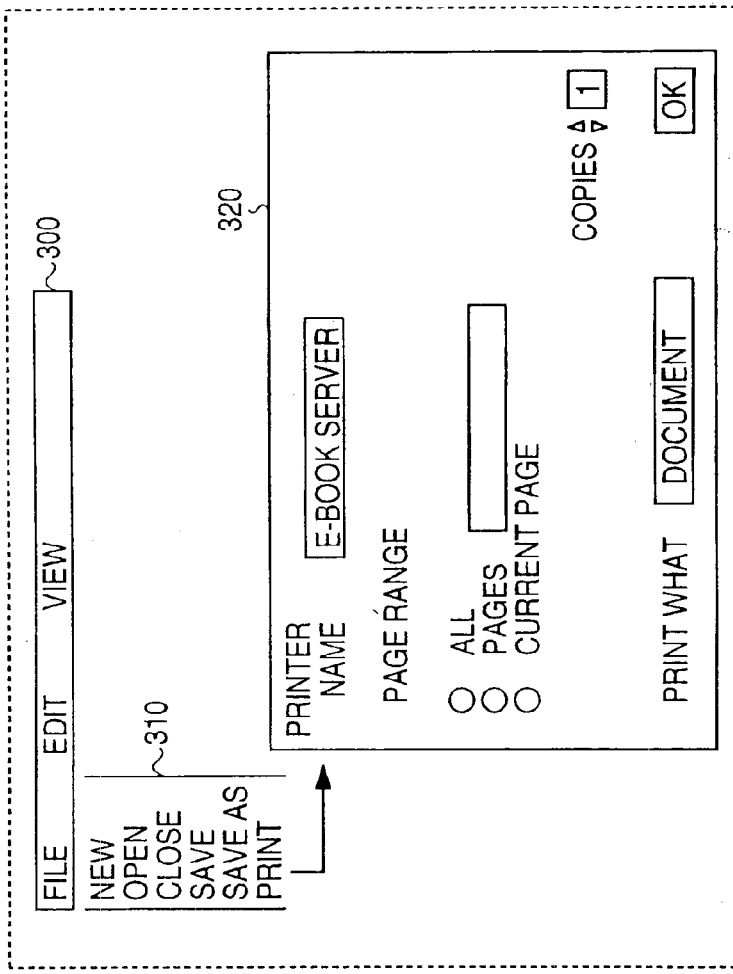
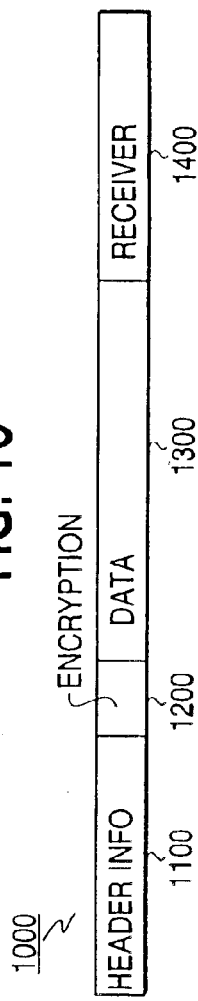

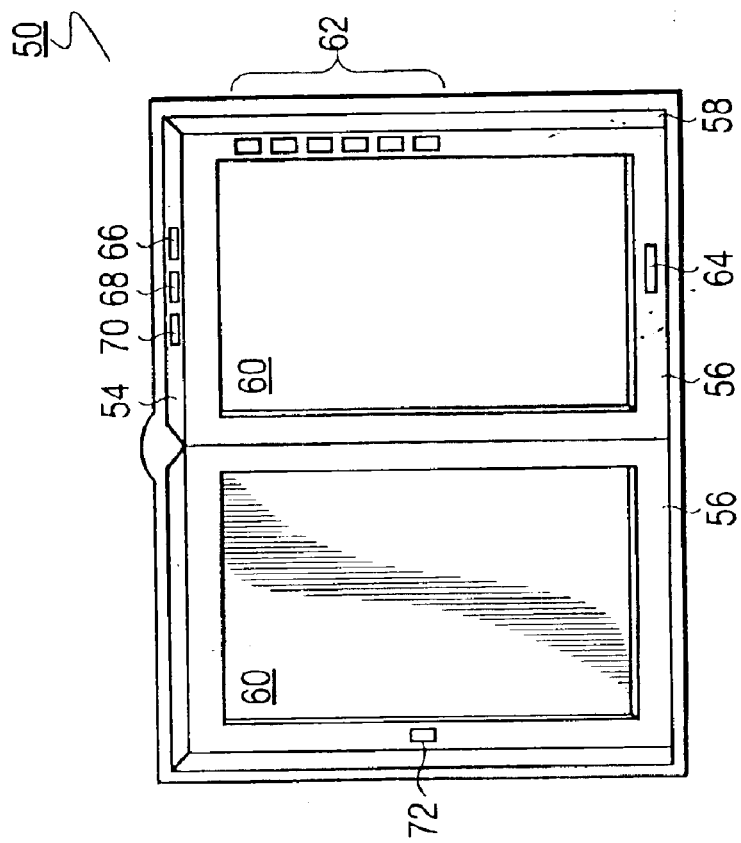
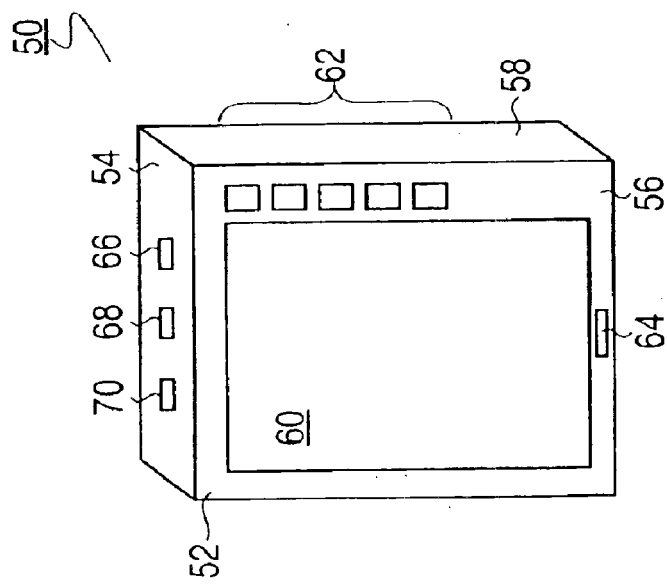

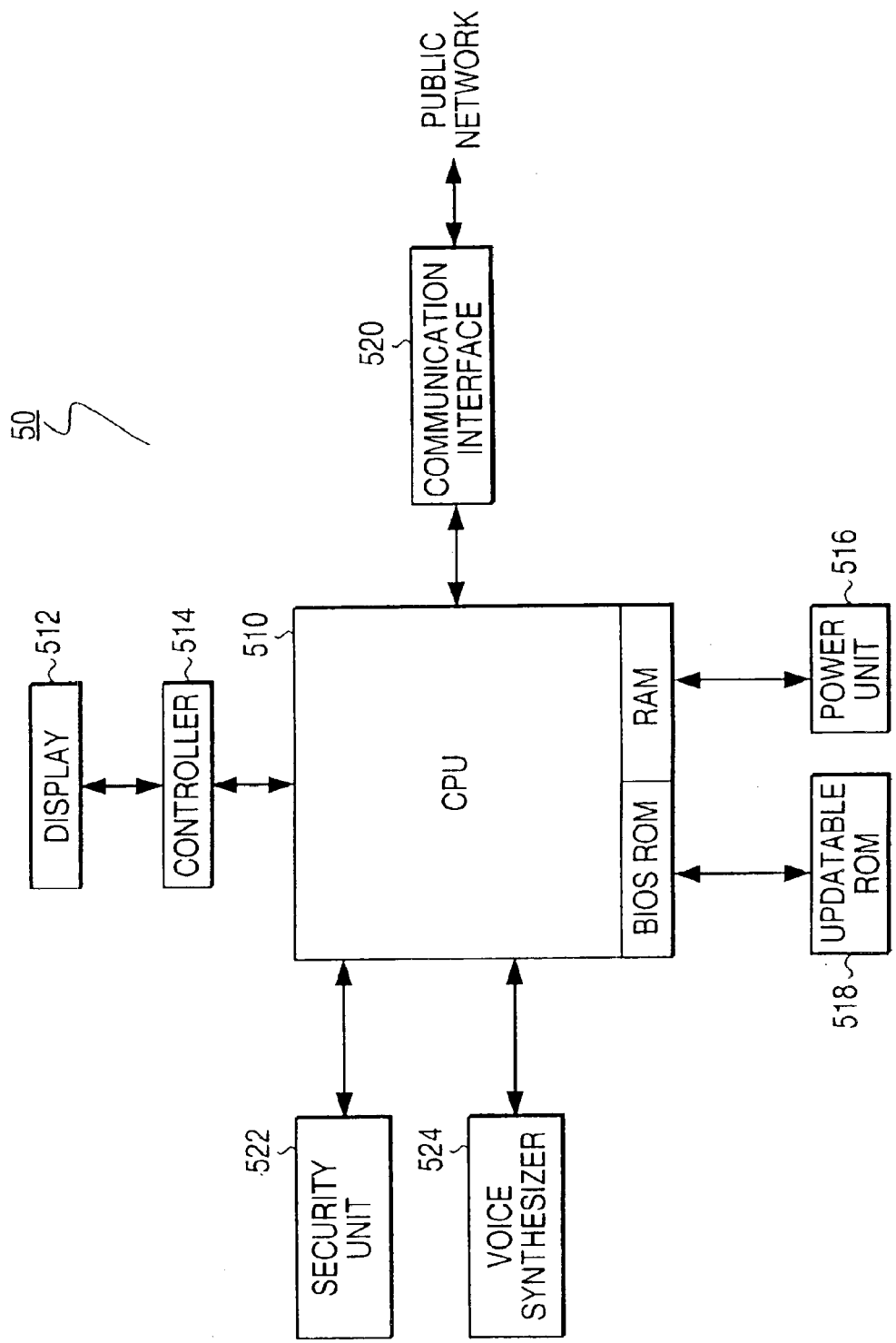

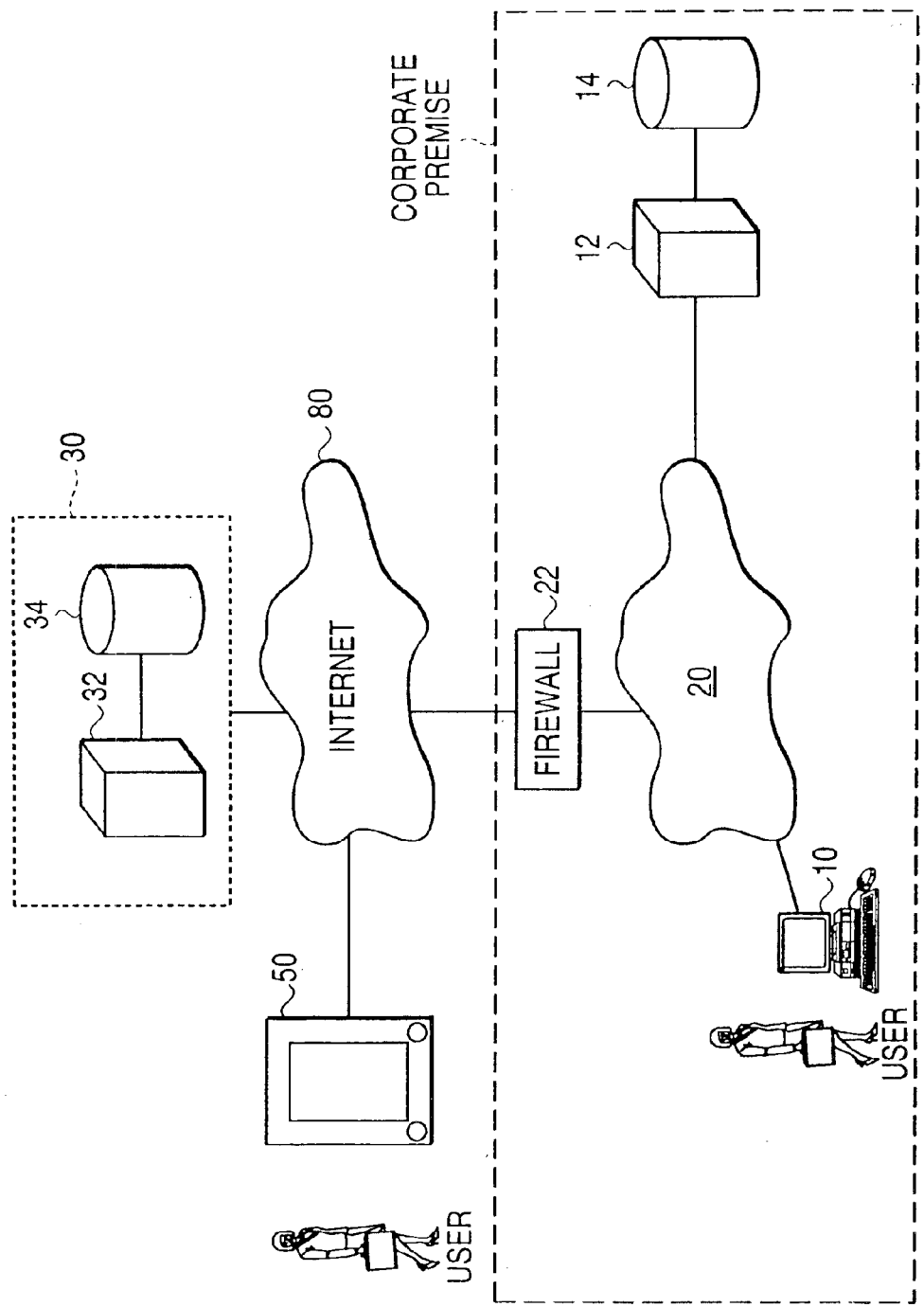

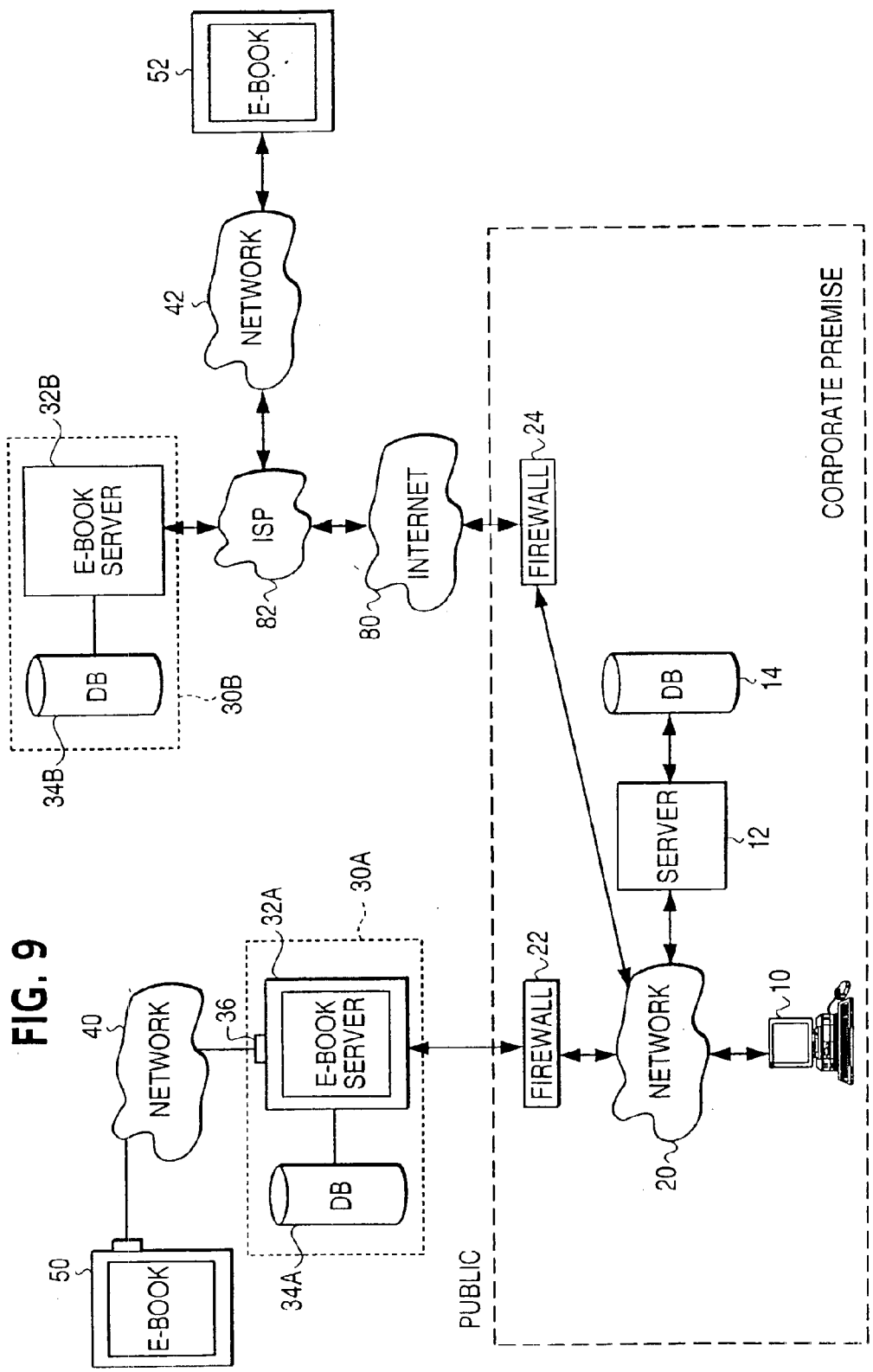

SYSTEM AND METHOD FOR ENHANCED DATA ACCESS EFFICIENCY USING AN ELECTRONIC BOOK OVER DATA NETWORKS

BACKGROUND OF THE INVENTION

1. Technical Field

The present invention relates to an electronic book system and more particularly, relates to a system and method for controlling distribution of electronic reading materials using an electronic book (e-book) server at different locations over a data network, and for enhanced data access efficiency at the e-book server at a designated location over a data network using an e-book.

2. Related Art

Printed materials are traditionally distributed in the form of printed books, magazines and newspapers. These traditional media are printed on paper with a page printed on each side of the paper on that when reading a book, magazine or newspaper, two pages of printed materials are exposed to the reader. These printed written materials consume vast quantities of paper and also shipping resources to transport to bookstores or newsstands for sale to the consumers, to libraries or warehouses for storage.

In recent years, virtually all commercially written materials including copyrighted materials have become available electronically on various on-line computer-based services, such as American Online®, CompuServe®, Prodigy®, the Internet and the World Wide Web (WWW). Many software products have been made to assist service providers to build on-line documents into books and organize those books into a virtual library. Search engines have been devised to assist on-line subscriber (user) in searching for needed information, and subsequent downloading to their personal computers (PC) using a telephone line modem or other communication systems such as electronic books (e-books) described, for example, in U.S. Pat. No. 5,893,132 for *Method And System For Encoding A Book For Reading Using An Electronic Book* issued to Huffman et al. However, these electronic written materials have not always been easy, or even as desirable to use as the common book printed on paper and bound in a soft or hard cover.

Generally, electronic written materials are stored in a remote on-line bookstore (e.g., remote server which contains an inventory of written materials in electronic form) of an electronic book system as described in WO 98/08344 for *Method And Apparatus For Viewing Electronic Reading Materials* issued to Sachs et al. An electronic book which contains built-in communications means is then used to automatically dial and access the remote on-line bookstore over a telephone line. When a communication link is established between the electronic book and the on-line bookstore, the user may display, browse, select and request for downloading selections to the electronic book for subsequent viewing and/or printing purposes.

Unfortunately, conventional electronic book system as described, for example, in WO 98/08344 for *Method And Apparatus For Viewing Electronic Reading Materials* issued to Sachs et al., provides limited access rights per individual users. Individual users must log on the on-line bookstore, via the electronic book, search from different categories of electronic written materials and request for download to the electronic book. The selected materials must also be converted into an electronic book format before downloading to the electronic book for subsequent viewing over a telephone line. Special conversion software must be installed at the on-line bookstore and the electronic book to convert the selected materials into an electronic book format for the individual user to download to the electronic book for reading purposes. Otherwise, printing of the selected materials, and particularly the copyrighted materials may be prohibited. As a result, distribution of the electronic reading materials may be limited.

Accordingly, there is a need an improved electronic book system for advancing distribution of electronic reading materials using an electronic book (e-book) server at different locations over different data networks in order to improve data access efficiency at the e-book server using an e-book or similar viewing device.

SUMMARY OF THE INVENTION

Accordingly, various embodiments of the present invention are directed to an improved electronic book (e-book) system for advancing distribution of electronic reading materials using an electronic book (e-book) server at different locations over different data networks. Such an electronic book system may comprise a private network; a central server connected to the private network, which stores a collection of electronic documents; an e-book server which stores an electronic document selected from the central server converted in an e-book format for later downloading to a remote e-book terminal, via a public network; and a host computer connected to the private network, which selects the electronic document from the central server, and uses a print function of an operating system to transfer the selected electronic document from the central server for storage in an e-book format at the e-book server for later downloading to a remote e-book terminal, via the public network.

The host computer may contain an e-book driver software and an emulation software installed therein to provide an interface with the operating system, direct the selected electronic document to the e-book server, and emulate the e-book server as a network printer in the private network. The emulation software includes a conversion subroutine for converting data reflecting the selected electronic document into an e-book format for storage at the e-book server. Both the e-book driver software and the emulation software may be embodied on any of a variety of computer readable media for use with the host computer.

Both the e-book driver software and the emulation software installed at the host computer may interact with the operating system to transfer the selected electronic document to the e-book server, via the private network, according to the following steps: activating the driver software, when a user selects a print function from the operating system; reading, at the driver software, data reflecting the, selected electronic document from a random-access-memory; directing, at the driver software, data reflecting the selected electronic document to the operating system for a physical redirection to the e-book server, via the private network; activating the emulation software, when the driver software returns to a stand-by (idle) mode; receiving, at the emulation software, data reflecting the selected electronic document from the driver software, via the operating system; converting, at the emulation software, data reflecting the selected electronic document into an e-book format and reformatting the data for the remote e-book terminal; and transmitting, at the emulation software, reformatted data reflecting the selected electronic document to the operating system for a physical redirection to the e-book server, via the private network.

The private network may correspond to a local area network (LAN), whereas the public network may correspond to one of a plain old telephone service (POTS), a public switched telephone network (PSTN), an integrated services digital network (ISDN), a mobile network, a satellite network, and/or an Internet.

The remote e-book terminal for use to download or request automatic delivery of a selected electronic document stored in an e-book format from the e-book server may comprise an electronic module which provides a central processing unit (CPU) to control all operations of the e-book terminal under instructions of the operating system, a BIOS read-only-memory (ROM), and a random-access-memory (RAM) which provides the primary memory space to write, store and retrieve information and program instructions used by the CPU; a display and a display controller which support a visual display of the selected electronic document on a display screen; a power unit which provides power supply to the e-book terminal; an updatable read-only-memory (ROM) which supports additional memory capacity; a communication interface which supports communications with the e-book server via the public network; and a security unit which provides overall security to the e-book terminal. The updatable ROM may comprise hundreds of megabytes or more of memory such as provided by PCMCIA memory storage cards, solid state EEPROMs, flash memory devices, bubble memory, a compact, large-capacity, miniature hard disk drive, or the like, for storage of the selected electronic document downloaded from the e-book server.

In accordance with another aspect of the present invention, the electronic book (e-book) system may comprise a private network; a central server connected to the private network, which stores a collection of electronic documents; a docking station connected to the private network, which supports an e-book terminal to receive an electronic document selected from the central server converted in an e-book format for later viewing off-line; and a host computer connected to the private network, which selects the electronic document from the central server, and uses a print function of an operating system to transfer the selected electronic document from the central server in an e-book format to the docking station for direct downloading into the e-book terminal for later viewing off-line.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 1 illustrates an improved electronic book system for advancing distribution of electronic reading materials using an electronic book (e-book) server at a designated location of a private network according to the principles of the present invention;

FIG. 2 illustrates an example step-by-step set-up procedure using the "Add Printer Wizard" for setting up a designated e-book server as a token network printer in a private network to print from an operating system (OS) of a desktop PC according to the principles of the present invention;

FIG. 3 illustrates an example graphical representation of a typical word processing application such as Microsoft Words or Corel WordPerfect for directing or transferring a selected electronic document to a designated e-book server which serves as a token network printer over a private network using a print function according to the principles of the present invention;

FIGS. 5A and 5B illustrate example e-book terminals for use to download or request for automatic delivery of a selected electronic document stored in an e-book format at a designated e-book server via a public network according to the principles of the present invention;

FIG. 6 illustrates a simplified circuit diagram of an example e-book terminal for use to download or request for automatic delivery of a selected electronic document stored in an e-book format at a designated e-book server via a public network according to the principles of the present invention;

FIG. 7 illustrates an improved electronic book system for advancing distribution of electronic reading materials using an electronic book (e-book) server at a designated location of a private network for downloading to a remote e-book terminal via an Internet according to another embodiment of the present invention;

FIG. 9 illustrates an improved electronic book system for advancing distribution of electronic reading materials using an electronic book (e-book) server at a designated location of different networks according to another alternative embodiment of the present invention; and FIG. 10 illustrates an example data packet with encryption for use in an improved electronic book system according to the principles of the present invention.

DETAIL DESCRIPTION OF EMBODIMENTS OF THE INVENTION

Figure 4:
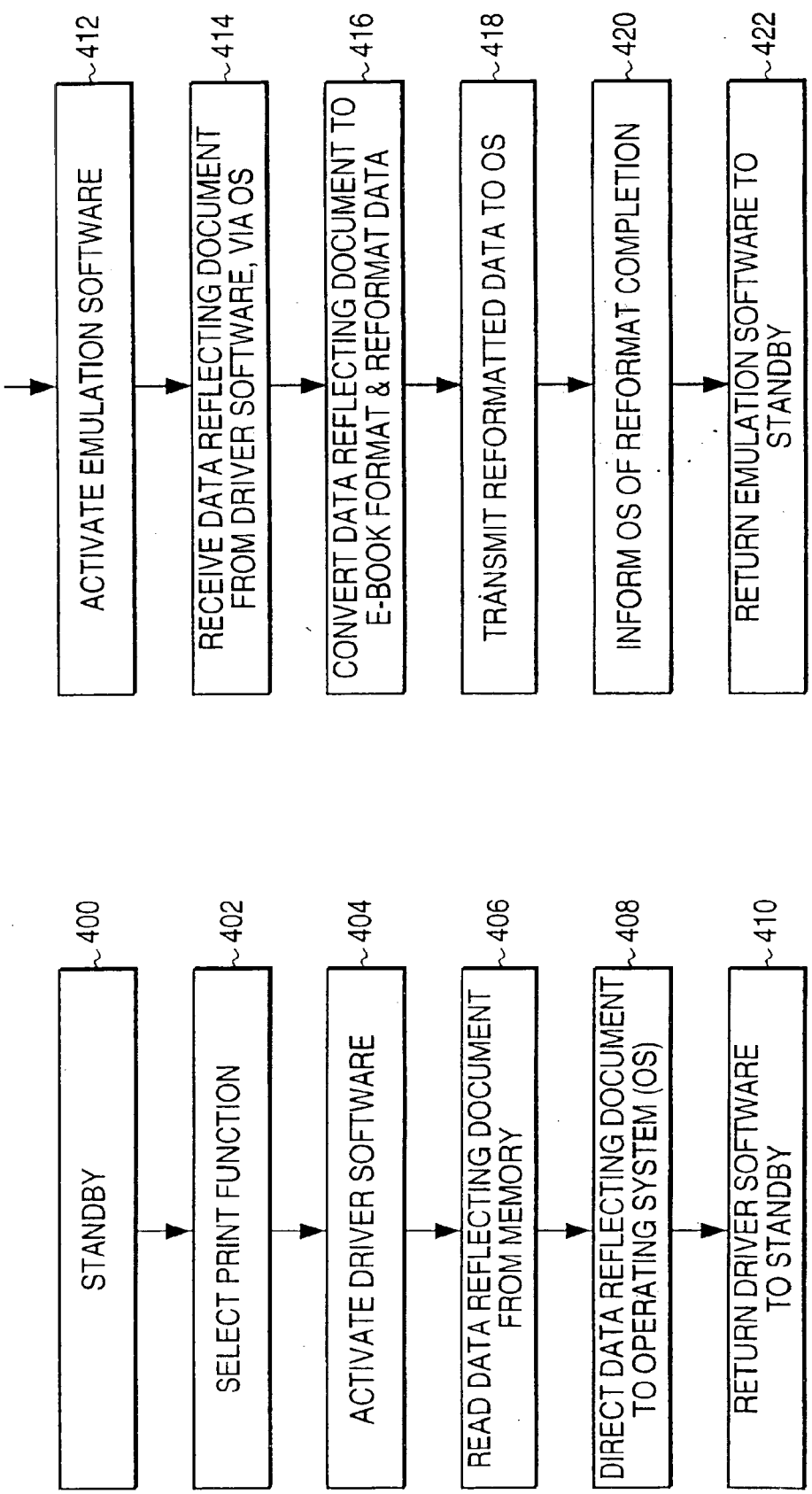
FIG. 4 illustrates an example flowchart of the interaction between the e-book driver software and the emulation software for directing or transferring a selected electronic document to a designated e-book server over a private network according to the principles of the present invention.

The present invention is applicable for use with all types of data networks, communication services, and electronic written materials. For example, data networks may be private or public networks, including a local area network (LAN), a wide area network (WAN), a plain old telephone service (POTS), a public switched telephone network (PSTN), an integrated services digital network (ISDN), a mobile network, a satellite network, an Internet, and networks such as terrestrial digital TV or radio, cellular, short-range radio (Bluetooth, Home RF protocol, wireless LAN) networks. The electronic written materials may include text, documents, pictures and graphics, such as, for example, artwork, audio clips, books, E-mail, faxes, games, magazines, movies, musical compositions, newspapers, photographs, software, video clips, etc. Likewise, the electronic book (e-book) or e-book terminal may be substituted with a portable viewer, a personal digital assistant, a palmtop computer, or any other known remote display device. However, for the sake of simplicity, discussions will concentrate mainly on a generic data network and electronic written materials, although the scope and implementation of the present invention is not limited thereto.

Attention now is directed to the drawings and particularly to FIG. 1, an improved electronic book system for advancing distribution of electronic reading materials using an electronic book (e-book) server at a designated location within a corporate premise according to a preferred embodiment of the present invention is illustrated. As shown in FIG. 1, the electronic book system may comprise a computer system (desktop PC) 10, a centralized server 12 having a database 14 for storing the electronic written materials at a central location of a company or within a corporate premise for example, a private network 20 such as a local area network (LAN), and an e-book server 30 for storing selected electronic written materials that have been converted into an electronic book format for individual users to subsequent download to an electronic book (e-book) terminal 50 for viewing over a public network 40 such as a plain old telephone service (POTS), a public switched telephone network (PSTN), and an integrated services digital network (ISDN). Firewall 22 may be installed to provide network security and protect the private network 20 from unauthorized access from the public network 40.

In order to facilitate distribution of electronic reading materials using an electronic book (e-book) server according to the preferred embodiment of the present invention, the electronic reading materials (referred to hereinafter as "documents") stored in the database 14 of the corporate server 12 may be retrieved by a user from the desktop PC 10, and then "printed" to the e-book server 30 using a print menu from an industry standard operating system (OS) (e.g., Microsoft Windows or LINUX) for later downloading, via a public network 40, to an e-book terminal 50. Print functionality of the desktop PC 10 according to the present invention refers to the ability of the desktop PC 10 to direct or transfer a selected document read from the corporate server 12 directly to the designated e-book server 30, where the selected document can readily be accessed by a remote e-book terminal 50 via a public network 40.

As contemplated by the present invention, especially configured e-book driver software and emulation software may be utilized at the desktop PC 10 and/or the corporate server 12 to provide an interface with an industry standard operating system (OS) (e.g., Microsoft Windows or LINUX) of the desktop PC 10 and/or the corporate server 12 to a designated e-book server 30 and/or a remote e-book terminal 50, and to emulate the designated e-book server 30 and/or remote e-book terminal 50 as an ordinary printer in a private network 20. The e-book driver software may be installed at the desktop PC 10 and/or corporate server 12 using the tools provided by the operating system (OS). For example, an "Add Printer Wizard" of Microsoft Windows 95/98 or Windows 2000 operating system (OS) of the desktop PC 10 may be used to provide a step-by-step set-up procedure for setting up a designated e-book server 30 as a token network printer in a corporate premise to print from Windows of the desktop PC 10.

The emulation software may preferably be installed at the e-book server 30 to emulate the e-book server 30 as an ordinary "printer" in a private network 20. Such emulation software may include a conversion subroutine for converting data reflecting a selected document (e.g., Windows Word format or ".doc") into an e-book format for storage at the e-book server 30. The conversion subroutine may include operations such as changing the page formatting information (so called mark-up language) from document form (e.g., Microsoft Word) to an e-book format. Emulation software may be available for different versions of an e-book terminal 50 or any other known remote display device. Such emulation software may specify the parameters which are typically to all printers, such as, the format or "size" of the print (how many lines and how many characters per line), character fonts and sizes (points), color capability, graphical capability etc. Alternatively, the emulation software may be installed at the desktop PC 10, the corporate server 12, or the e-book terminal 50, particularly when no e-book server 30 is connected to the private network 20 of a corporate premise. For example, a docking station may be used in lieu of an e-book server 30 for enabling an e-book terminal 50 to receive an electronic document directly from the corporate server 12 under instructions of the desktop PC 10.

Software program code which employ the e-book driver software of the present invention is typically stored in a desktop PC 10 from which a user may access the code for directing data reflecting a selected document to a designated e-book server 30. Similarly, software program code which employ the emulation software of the present invention is typically stored in a corporate server 12 from which a developer may access the code for distribution purposes. Both types of software program codes may be integrated, and may be embodied on any of a variety of known media for use with a computer system (desktop PC) such as a diskette or CD-ROM, or may be distributed to users from a memory of one computer system over a network of some type of other computer systems for use by users of such other systems. Such techniques and methods for embodying software code on media and/or distributing software are well-known and will not be further discussed herein.

FIG. 2 illustrates an example step-by-step set-up procedure using the "Add Printer Wizard" for setting up a designated e-book server 30 as a token network printer in a private network 20 of a corporate premise to print from Microsoft Windows 95 or Windows 2000 operating system (OS) of a desktop PC 10. The Printers Folder of Windows application may be opened in the following ways: 1) from the Start menu, point to Settings, and then click Printers, (2) in My Computer menu, double-click the Printers Folder; or (3) In Control Panel, double-click the Printers icon. As shown in FIG. 2, the "Add Printer Wizard" provides a step-by-step procedure for a user to set-up and configure a designated e-book server 30 as a token network printer over a private network 20. For example, the "Add Printer Wizard" allows the user to begin installing a designated e-book server 30 as a token network printer over a private network 20 at step 200, to select a network printer at step 210, to specify a network path or queue name of the token network printer at step 220, or to browse to view available network printers at step 230, to set additional properties and other settings of the driver software for the token network printer at steps 240 and 250.

When the designated e-book server 30 is installed as a token network printer over a private network 20 using the "Add Printer Wizard" for example, a selected electronic document retrieved from the corporate server 12 at the desktop PC 10 may be directed or transferred to the designated e-book server 30 which serves as a token network printer over a private network 20 using a print function. The selected electronic document from the desktop PC 10 may be directed or transferred to the designated e-book server 30 over a private network 20 in several ways. If the selected electronic document is open at the desktop PC 10, the user may click a print function from the File menu for a physical redirection to a designated e-book server 30 which serves as a token network printer for storage. If the electronic document is not open, the user may drag and drop the electronic document onto the printer icon located in the printers folder or on the desktop PC 10 for a designated e-book server 30 which serves as a token network printer. Other ways to direct the selected electronic document to the designated e-book server 30 over a private network 20 may be available depending upon the operating system (OS) used at the desktop PC 10.

FIG. 3 illustrates an example graphical representation of a typical word processing application such as Microsoft Words or Corel WordPerfect for directing or transferring a selected electronic document to a designated e-book server 30 which serves as a token network printer over a private network 20 using a print function. As shown in FIG. 3, a print function 320 may be selected from File menu 310 of the Menu Bar 300 (or from the Toolbar) of a typical word processing application. The print function 320 provides a visual indication of the destination of the selected electronic document, that is, the designated e-book server 30 over a private network 20 for storage and subsequent downloading to an electronic book (e-book) terminal 50 for viewing over a public network 40.

If the emulation software is installed in conjunction with the e-book driver software at the desktop PC 10 or the corporate server 12, the selected electronic document at the desktop PC 10 or the corporate server 12 may first be converted into an e-book standard format, via a conversion subroutine, before a physical redirection to a designated e-book server 30 over a private network 20. Alternatively, if the emulation software is installed at the designated e-book server 30, the selected electronic document at the desktop PC 10 may first be directed or transferred to the designated e-book server 30 over a private network 20 for conversion into an e-book standard format. In either situation, the e-book driver software and the emulation software may interact to direct or transfer a selected electronic document to a designated e-book server 30 over a private network 20 for subsequent downloading to an e-book terminal 50 for reading purposes.

FIG. 4 illustrates an example flowchart of the interaction between the e-book driver software and the emulation software for directing or transferring a selected electronic document to a designated e-book server 30 over a private network 20 according to the principles of the present invention. Both the driver software and the emulation software may be installed, for example, at the desktop PC 10. The driver software and the emulation software first start in a stand-by (idle) mode at block 400. When a user selects a print function from the File menu of an operating system (OS) for directing or transferring a selected electronic document to a designated e-book server 30 over a private network 20 at block 402, the operating system (OS) activates the driver software at block 404. The driver software then reads data reflecting an electronic document from a work memory such as a random access memory (RAM) at block 406. Next, the driver software directs the data reflecting the electronic document to an operating system (OS) for a physical redirection to a designated e-book server 30 over a private network 20 at block 408. Afterward, the driver software returns back to a stand-by (idle) mode at block 410.

The emulation software is then activated at block 412. The emulation software receives data reflecting the electronic document from the driver software, via an operating system (OS) at block 414. Next, the emulation software converts data reflecting the electronic document into an e-book format and reformats the data for a remote e-book terminal 50 (e.g., the number of lines, the number of characters per line, the character fonts and sizes, the color capability and graphical capability etc.) at block 416. After data reformatting, the emulation software transmits the converted and reformatted data reflecting the electronic document to an operating system (OS) at block 418, and informs the operating system (OS) when the print function is completed at block 420. Afterwards, the emulation software returns to a stand-by (idle) mode at block 422.

If the emulation software is installed at the desktop PC 10, the data reflecting the electronic document may be converted into an e-book format and reformatted at the desktop PC 10 for a physical redirection to a designated e-book server 30 for subsequent downloading to a remote e-book terminal 50. Alternatively, if the emulation software is installed at the e-book server 30, then the data reflecting the electronic document may be converted into an e-book format and reformatted at the e-book server 30 for subsequent downloading to a remote e-book terminal 50. Both the driver software and the emulation software may interact and execute concurrently. In particular, all software processes as described with reference to blocks 400–422 may be executed concurrently as long as the end result of the driver software and the emulation software is maintained. However, the format conversion and the data reformat of block 416 may be executed in reversed order.

When the selected electronic document in an e-book format is stored at the e-book server 30, the user may access the e-book server 30 from a remote e-book terminal 50 via a public network 40 and request for downloading or automatic delivery of the selected electronic document in an e-book format to the remote e-book terminal 50 via the public network 40. The public network 40 may include a plain old telephone service (POTS), a public switched telephone network (PSTN), an integrated services digital network (ISDN), a mobile network, a satellite network, an Internet, a terrestrial digital TV network, a cellular network, and a short-range radio (Bluetooth, Home RF protocol, wireless LAN) network. Since the selected electronic document is already stored in an e-book format at the e-book server 30, the electronic document from the e-book server 30 may be quickly and efficiently distributed to different e-book terminals at different locations over a plurality of networks in order to improve data access efficiency.

FIG. 5A illustrate an example e-book terminal 50 for use to download or request for automatic delivery of a selected electronic document stored in an e-book format at a designated e-book server 30 via a public network 40 according to the principles of the present invention. As shown in FIG. 5A, the e-book terminal 50 may include a front face 52, a top 54, a base 56 and opposite sides 58. The front face 52 includes a display screen 60 which may be a liquid crystal display (LCD), cathode ray tube (CRT), electro-luminescent display (EL) or other display device as is known in the technology. In a preferred embodiment, the display screen 60 is an LCD. Located next to the display screen 60 are a plurality of keys or function switches 62 which are used to select icons displayed on the display screen 60. These icons may represent different electronic documents and user-selectable functions. For example, each icon may represent a product that has been downloaded to the e-book terminal 50 from the e-book server 30 via the public network 40, pre-loaded products such as a dictionary, thesaurus, and/or a world atlas, or a function that the user can invoke such as establishing communications with the e-book server 30 via the public network 40. These icons may also represent the various stored products by displaying graphical/textual images. The brightness of the display screen 60 may be controlled by an LCD adjust switch 64 located below the display screen at the base 56.

Located on the top 54 of the e-book terminal 50 may be a power switch 66 for powering the e-book terminal 50 on or off, a phone jack 68 or other communication interface device for establishing communication with the e-book server 30 via a public network 40, and a power adapter 70 for providing power supply to the e-book terminal 50. The e-book terminal 50 may also include an electronic module (not shown) which supports circuitry such as a central processing unit (CPU), memory devices such as a BIOS read-only-memory (ROM), a random-access-memory (RAM) and an updatable ROM which will be described in detail hereinbelow.

FIG. 5B illustrates another example e-book terminal 50 for use to download or request for automatic delivery of a selected electronic document stored in an e-book format at a designated e-book server 30 via a public network 40 according to the principles of the present invention. As shown in FIG. 5B, the e-book terminal 50 may be sized and configured to be book size and to open like a book for use. The e-book terminal 50 has two opposing pages and contains similar components as that described with reference to FIG. 5A, such as a front face 52 which supports display screens 60, a top 54, a base 56 and opposite sides 58. The e-book terminal 50 may also include a LCD adjust switch 64 located at the base 56, a power switch 66, a phone jack (modem) 68, and a power adapter 70 located at the top 54. In a preferred embodiment, the display screens 60 may be touch sensitive such that the plurality of keys or function switches 62 used to select icons displayed on the display screens 60 may not be necessary.

When opened, the user may see two facing page-like touch sensitive, display screens 60 with black print on a white background. Icons 62 may represent different electronic documents and user-selectable functions. When an electronic document is selected, information may be displayed and the user can read page by page or go directly to a particular page by touching the page number of the desired selection as listed. Closing the e-book terminal 50 automatically shuts down the device. Additional electronic documents can be downloaded from a designated e-book server 30, and can be deleted to make room for the new material. Inputs to the e-book terminal 50 may be through the touch-sensitive display screens 60 and the communication link established with the designated e-book server 30 via the phone jack (modem) 70.

Turning now to FIG. 6, a simplified circuit diagram of an exemplary e-book terminal 50 shown in FIGS. 5A and 5B for use to download or request for automatic delivery of a selected electronic document stored in an e-book format at a designated e-book server 30 via a public network 40 according to the principles of the present invention is illustrated. As shown in FIG. 6, the exemplary e-book terminal 50 includes an electronic module 510 which provides a central processing unit (CPU) to control all operations of the e-book terminal 50 under instructions of the propriety operating system embedded in a solid-state device, the BIOS ROM, and random-access-memory (RAM) which provides the primary memory space to write, store and retrieve information and program instructions used by the CPU. The e-book terminal 50 also includes a display 512 and a display controller 514 which support the display screen 60, a power unit 516 which provides power supply, an updatable ROM 518 which supports additional memory capacity, a communication interface 520 which supports communications with a designated e-book server 30 via a public network 40, a security unit 522 which provides overall security, and optionally, a voice synthesizer 522 which provides a spoken auditory display of pages of an electronic document downloaded from the e-book server 30.

The power unit 516 typically includes one or more rechargeable batteries and power and charging circuits. These power and charging circuits control and distribute battery power or converted AC line power to the e-book terminal components, control the charging of the internal battery or batteries when the e-book terminal 50 is connected to an external AC adapter/charger device via the AC adapter/charger jack 70 (see FIGS. 5A–5B) and controls switchover between battery power and external AC line power when said AC power is available via the AC adapter/charger device. The AC power adapter/charger device serves a dual function of interfacing the e-book terminal 50 to the AC power line for recharging the internal battery and also for operating the e-book terminal 50 from the AC power line so as to conserve battery power. An alternative embodiment incorporates an internal AC adapter/charger device that replaces the AC adapter/charger jack 70 with a connector that accepts an AC power cord for direct connection to AC line power. The rechargeable battery comprises a lithium ion battery, a nickel hydride (NiMH) battery, or the like. The rechargeable battery or batteries may power an e-book terminal 50 for a minimum of 10 hours between recharges, although 5 to 8 hours is typical.

When the e-book terminal 50 is opened, power is automatically applied and the electronic module 510 automatically loads the proprietary operating system and any pre-stored settings from previous operations. Typically, the electronic module 510 initializes the e-book terminal 50 by displaying the icons for the electronic document stored in the updatable ROM 518 and any function icons such as the connect-to-the-bookstore icon. This screen display information is sent from the electronic module 510 via display controller 514 to the display screens 60 (left and right display screens 60). The display controller 370 can be a dual-screen graphic controller or a separate graphic controller can be provided for each display. Alternatively, the display controller(s) can provide independent, coordinated, or complementary (a single page of material spanning both display screens 60) display of material across the two display screens 60 (if the e-book terminal 50 of FIG. 5B is used).

The updatable ROM 518 may comprise hundreds of megabytes or more of memory such as provided by PCM-CIA memory storage cards, solid state EEPROMs, flash memory devices, bubble memory, a compact, large-capacity, miniature hard disk drive, or the like. Each embodiment of the e-book terminal 50 has sufficient storage to store several books of textual information in their entirety. The number of electronic documents that can be stored varies depending on the storage requirements of the individual items, the compression techniques used and the amount of memory available in a particular e-book terminal 50.

The communication interface 520 may comprise a high-speed modem with a telephone line interface such as provided by an internal data modem connected to a cellular telephone for wireless connection to the public network 40 such as a PSTN, or an internal data modem connected to a telephone jack and then connected via a telephone wire to a telephone outlet connected to the public network 40, or a PCMCIA slot for a PCMCIA modem that is then connected via a telephone wire to a telephone outlet connected to the public network 40, or the like. Embodiments include a 56 K bps internal modem with a telephone line connector, an internal modem directly wired to a retractable standard telephone line terminated with a standard modular telephone jack that the user plugs into a mating telephone line socket, and the like. Modem chip sets for 56 K bps are readily available from manufacturers such as AT&T, Rockwell, U.S. Robotics, and the like. Cellular modems incorporating both data modem functions and cellular telephone functions are available from Motorola Corporation and other manufacturers.

The security circuit 522 may be incorporated with a unique e-book terminal security identification code that is used in conjunction with the individual owner or user identification code to identify a particular e-book terminal 50 to the e-book server 30, to code each updatable ROM 518 to a particular e-book terminal 50 so that the data stored in memory storage can only be accessed by the e-book terminal 50 that downloaded the information or product from the e-book server 30 and to discourage theft of the e-book terminal 50. The e-book server 30 may terminate communications with an e-book terminal 50 if the user identification code or the security identification code is invalid.

The proprietary operating system controls and manages all operations of the e-book terminal 50 such as accepting user instructions via the user interface (the display screens 60), accessing and displaying or running the products stored in the updatable ROM memory storage device, providing book-like functions, automatically accessing, connecting to and downloading products from the on-line bookstore, providing power management to power down the unit after a user-specified time of inactivity, and the like. This operating system can be preloaded onto a BIOS (basic input/output system) chip, preloaded on an EEPROM to facilitate updates to the operating system while the e-book terminal 50 is communicating with the e-book server 30, via a public network 40.

One possible enhancement of the e-book terminal 50 may be the incorporation of audio output means such as one or more speakers and/or an earphone jack or external speaker jack, audio/sound processing circuits and software to support the sound capabilities of multimedia products, to support text-to-speech (TTS) synthesis to create spoken output based on stored electronic document. The sound processing capabilities comprise circuitry and software to support 16-bit or 32-bit Sound Blaster-compatible audio with MIDI support and wavetable or FM synthesis.

Another enhancement of the e-book terminal 50 may be to provide the capability to send one or more page images or selected passages to a printer to a obtain hard copy printout of the selected information. A printer connection is implemented by providing a parallel printer port with associated circuitry and software drivers; or a serial communications port with associated circuitry and software drivers; or an infrared data port with associated circuitry and software drivers to beam pages of information through the air to an infrared equipped printer, or by sending the information via the internal communication means or the e-book terminal 50 to a modem-equipped computer, a facsimile device or a printer equipped with a telephone line interface and modem; or the like.

As described with reference to FIGS. 5A–5B and 6, the user may use the e-book terminal 50 in the same fashion as the printed book. An e-book server icon is provided to automatically initiate and establish communications with a designated e-book server 30, via a public network 40. When the user touches this icon or presses a corresponding function switch 62 (see FIG. 6), the e-book terminal 50 requests the user to enter a user identification code and/or a password that will uniquely identify the user to the e-book server 30 and then the e-book terminal 50 uses the build-in communications means to automatically dial out over a telephone link, for example, to access the remote e-book server 30 via the public network 40. This user identification code and/or password can be the same code or password used to initially active the e-book functions when said code or password is enabled. An alternative embodiment uses a user identification code encoded into a particular e-book terminal 50 when the unit is procured and then only request the user's password for access.

The communications means built into the e-book terminal 50 may comprise a cellular modem/telephone as shown in FIGS. 5A–5B and 6 that communicates with the public network 40 via two-way wireless radio waves to a local telephone office or receiving station, thus eliminating the need for a hard-wired connection; or a data modem with telephone jack, or the like, which is connected via a telephone cable to your telephone line and then to the local telephone office; or any modem/telephone interface device that can establish a communications link with the public network 40.

Having established a communication is link to the e-book server 30, the e-book server 30 may display a welcome screen and the various directories the user can access or services available. Upon entering an e-book server 30 or selecting a service, the electronic document selections can be displayed on the e-book terminal 50. In order to read electronic document, the user touches the icon representing the selection to be read. The selection typically opens to a document directory (table of contents). The user may page through the material ahead or backward. When open to the directory page, the user can touch the page number of any electronic document listed to immediately go to that page. When the user finishes reading, the user can place a bookmark at their current page by touching the page number and then closing the e-book terminal 50. Otherwise the user merely closes the e-book terminal 50 to turn it off. When the e-book terminal 50 is next opened, if a bookmark was placed, the e-book terminal 50 may automatically display the page so marked and the user can continue to read from the place they stopped. Otherwise the e-book terminal 50 displays the icons representing all currently stored products and functions.

When the user is finished with a stored selection, the user can easily delete this selection to make room for more selections to be downloaded from the e-book server 30, via the public network 40. To delete a selection, the user merely touches a delete icon, touches the icon for the selection to be deleted or touches the item when presented in a textual list and then touches a confirmation icon. The e-book terminal 50 then deletes the selection and thus frees up memory storage. Further, instead of deleting selections, the user can save downloaded selections to a memory card and then swap memory cards by removing the memory card currently installed and then inserting another memory card in its place. In this fashion, the user can retain a personal collection of favorite electronic documents.

The e-book server 30 is an on-line, electronic archive of electronic documents that are already converted in an e-book format, encoded and stored so that when displayed on the e-book terminal 50 these documents maintain the same visual format as printed material. These materials may be downloaded directly, via the public network 40 such as a PSTN to a communications means integral to the e-book terminal 50. Users can display, browse, select, download selections to their e-book terminal 50 and then display and view or read printed selections or run the products. Downloaded selections are sent in compressed formatted, stored in the e-book terminal 50 and then automatically decompressed.

In an alternative embodiment, document selections can be immediately downloaded or the user can schedule a later time for downloading. For later downloading, the user may depress a Download Later icon and then enters the date and time for downloading by depressing (touching) and adjusting a date and time display presented by the e-book terminal 50. The e-book terminal 50 may then program or preset this dial-up time along with an identification sequence for the item or items to be downloaded into its electronic module 510 (see FIG. 6). The user leaves their e-book terminal 50 connected to a dial-up telephone line via the internal cellular telephone or via the hard-wired telephone connection to the telephone jack, or the like, and at the appointed dial-up time, the user's e-book terminal 50 automatically and without user intervention dials up and connects to the e-book server 30, via the public network 40, identifies itself and transmits the identification sequence for the item or items to be downloaded. The e-book server 30 may then download the requested item(s) to the e-book terminal 50, via the public network 40, the items are stored, and at the completion of the download, the e-book terminal 50 may disconnect and turn itself off. This flexibility enables the user to schedule downloading when the e-book terminal 50 is not in active use, during off-peak hours to reduce telephone connect charges, or the like.

Alternative embodiments of the e-book terminal 50 may incorporate MPEG 1 and MPEG 2 decoders to provide enhanced motion video displays of video clips or animation sequences such as those used in multimedia and other products.

FIG. 7 illustrates another embodiment of an improved electronic book system for advancing distribution of electronic documents using an e-book server 30 at a designated location within a corporate premise according to the present invention. As shown in FIG. 7, the electronic book system may include the same system components described with reference to FIG. 1, including, for example, the desktop PC 10 and the centralized server 12 having the database 14 connected to a private network 20 such as a local area network (LAN). However, the public network 40 may instead be an Internet, and the e-book server 30 may be located outside of the corporate premise for storing the selected electronic document that has been converted into an electronic book format for individual users to subsequent download to an e-book terminal 50 for viewing over the Internet 40. In this embodiment, the user may "print" one or more electronic documents from the desktop PC 10 or from the corporate server 12 to an e-book server 30 located via an Internet 40 for later downloading via the Internet 40 to an e-book terminal 50.

Figure 8:
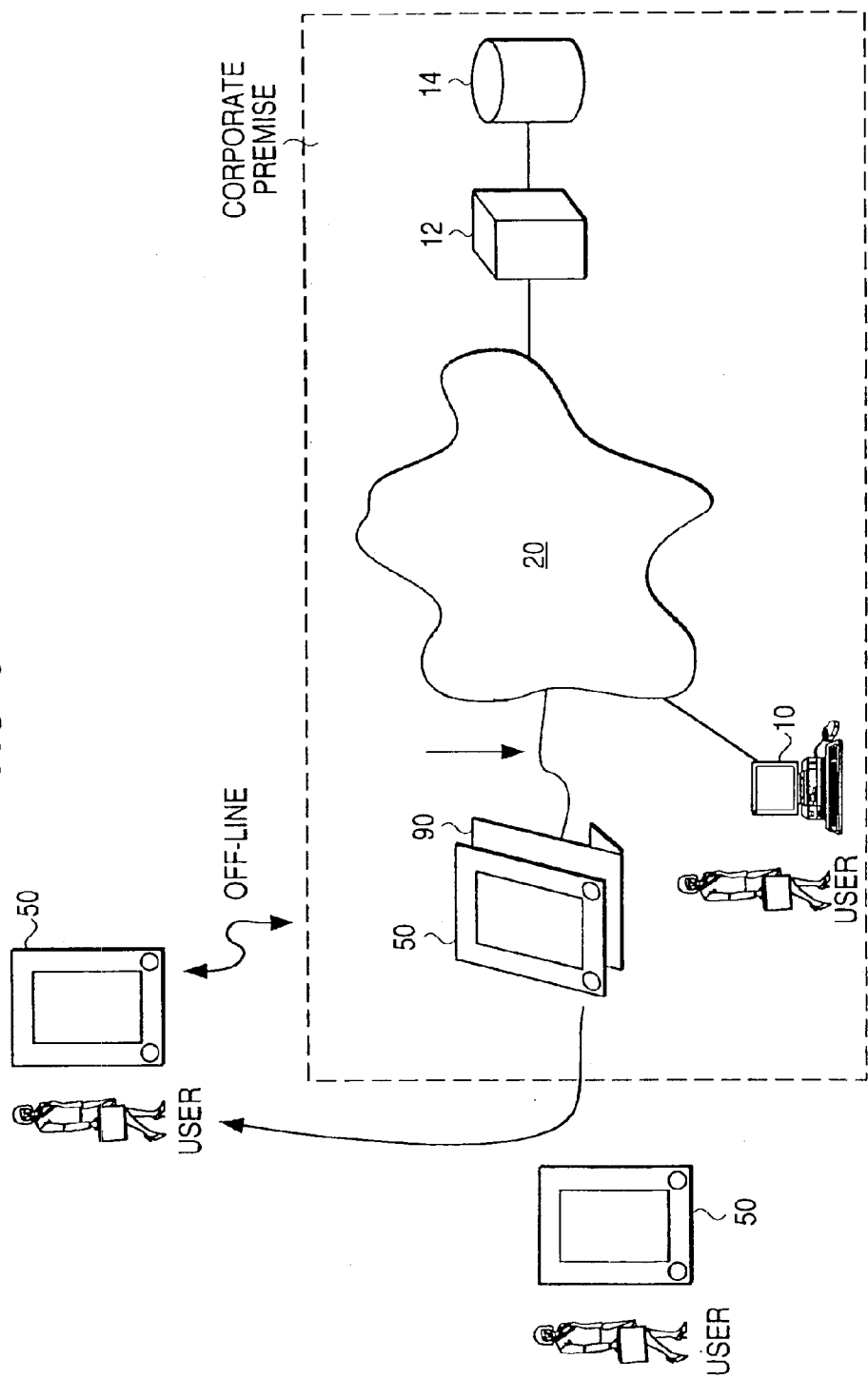
FIG. 8 illustrates an improved electronic book system for advancing distribution of electronic reading materials using an electronic book (e-book) server at a designated location of a private network according to yet another embodiment of the present invention.

FIG. 8 illustrates yet another embodiment of an improved electronic book system for advancing distribution of electronic documents using an e-book server 30 at a designated location of a private network 20 according to the present invention. As shown in FIG. 8, the electronic book system may include the same system components described with reference to FIG. 1, including, for example, the desktop PC 10 and the centralized server 12 having the database 14 connected to a private network 20 such as a local area network (LAN). However, the selected electronic document is directed or transferred directly to a docking station 90 connected to the private network 20 instead of an e-book server 30. The docking station 90 may allow the e-book terminal 50 to receive the electronic document directly and conveniently. In this embodiment, the user may "print" one or more electronic documents from the desktop PC 10 or from the corporate server 12 directly to an e-book terminal 50 which is connected to the private network 20 instead of an e-book server 30. This way the user can take the e-book terminal 50 from the docking station 90 and "read" the electronic document off-line.

FIG. 9 illustrates a combination embodiment of an improved electronic book system for advancing distribution of electronic document using an electronic book (e-book) server at a designated location of different networks according to the present invention. As shown in FIG. 9, the electronic book system may comprise a computer system (PC) 10, a centralized server 12 having a database 14 for storing the electronic written materials at a central location within a company, for example, a private network 20 such as a local area network (LAN), and different remote e-book servers 30A and 30B at different locations, via the private network 20 and/or the Internet 80 and the Internet Service Provider (ISP) 82, for storing selected electronic documents that have been converted into an e-book format for individual users to subsequent download to e-book terminals 50 and 52 for viewing over public networks 40 and 42. Firewalls 22 and 24 may be installed to separate a trusted, private network 20 from an untrusted, public network such as the Internet 80. The firewalls 22 and 24 may be utilized to provide network security and protect the private network 20 from unauthorized access from the public network such as the Internet 80. In this embodiment, the user may "print" one or more electronic documents from the desktop PC 10 or from the corporate server 12 to different e-book servers 30A and 30B over different data networks 40 and 42 for later downloading to an e-book terminal 50 and 52.

Preferred embodiments of the electronic book system which comprises the desktop PC 10, the corporate server 12 with database 14, the e-book server 20 and the e-book terminal 50 as described with reference to FIGS. 1–9, incorporate one or more internetwork security tools to protect the content of information during transmission across a network, to assure the authenticity of network interactions, and to thwart attempts to subvert system by means of network access capabilities. This way only an intended e-book terminal 50 has the right to access and read the electronic document stored in the designated e-book server 30, via the public network 40. Examples of such internetwork security tools may include conventional encryption (also referred to as symmetric encryption or single-key encryption) based on the data encryption standard (DES), and public-key encryption such as the use of PGP (Pretty Good Privacy) scheme and PEM (Privacy Enhanced Mail) for providing authentication and confidentiality services as part of an electronic book system. If PGP encryption scheme is used, for example, a combination of private and public keys may be utilized to allow the desktop PC 10 to encrypt the selected electronic document from the corporate server 12 and send the encrypted data reflecting to the electronic document to the e-book server 30, via a private network 20, for subsequently downloading to a remote e-book terminal 50. The remote e-book terminal 50 may then decrypt the encrypted data reflecting the electronic document. PGP encryption scheme may be a software algorithm, hardware device, or combination of the two as is known in the network and internetwork security technology.

FIG. 10 illustrates an example data packet with encryption for use in an improved electronic book system according to the principles of the present invention. The data packet transmission may comply with the Internet-standard suite of protocols used throughout the Internet and private intranets such as Transmission Control Protocol/Internet Protocol (TCP/IP). As shown in FIG. 10, the data packet 1000 may include sender information 1100 followed by encryption data 1200, information data 1300, and receiver information 1400. The sender information 1100 contains, for example, IP addresses fields (32-bit global Internet address, generally consisting of a network identifier and a host identifier), a version field used to specify which version of the IP is represented in the data packet (for example, IP Version 4 and IP Version 6), a type of service field used to specify how the data packet is to be handled in a network which offer various service qualities, and a header checksum field used to verify transmission error.

As described from the foregoing, the present invention advantageously provides an advanced electronic book system for advancing distribution of electronic reading materials using an electronic book (e-book) server at different locations over different data networks in order to improve data access efficiency at the e-book server using an e-book or similar viewing device.

While there have been illustrated and described what are considered to be preferred embodiments of the present invention, it will be understood by those skilled in the art that various changes and modifications may be made, and equivalents may be substituted for elements thereof without departing from the true scope of the present invention. Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. An electronic book (e-book) system, comprising:
a private network;
a central server connected to said private network, which stores a collection of electronic documents;
an e-book server which stores an electronic document selected from said central server converted in an e-book format for later downloading to a remote e-book terminal, via a public network; and
a host computer connected to said private network, which selects the electronic document from said central server, and uses a print function of an operating system to transfer the selected electronic document from said central server for storage in an e-book format at said e-book server for later downloading to said remote e-book terminal, via said public network.

2. The system as claimed in claim 1, wherein said host computer comprises an e-book driver software to provide an interface with said operating system and to direct the selected electronic document to said e-book server, and an emulation software to emulate said e-book server as a token network printer in said private network.

3. The system as claimed in claim 2, wherein said e-book driver software is installed at said host computer using an Add Printer Wizard provided by the operating system for setting up said e-book server as a token network printer in said private network to print from the operating system of said host computer.

4. The system as claimed in claim 2, wherein said emulation software is installed at one of said host computer and said e-book server to emulate said e-book server as a token network printer in said private network, and includes a conversion subroutine for converting data reflecting the selected electronic document into an e-book format for storage at said e-book server.

5. The system as claimed in claim 2, wherein said e-book driver software and said emulation software are embodied on any of a variety of computer readable media for use with said host computer.

6. The system as claimed in claim 2, wherein said emulation software installed at said host computer emulates said e-book server as a token network printer and then converts the selected electronic document into an e-book format, via said conversion subroutine, before a physical redirection to said e-book server over said private network.

7. The system as claimed in claim 2, wherein said emulation software installed at said host computer emulates said e-book server as a token network printer and then converts the selected electronic document into an e-book format transferred from said host computer to said e-book server, via said conversion subroutine.

8. The system as claimed in claim 2, wherein said e-book driver software and said emulation software installed at said host computer interacts with the operating system to transfer the selected electronic document to said e-book server, via said private network, according to the following steps:
activating said driver software, when a user selects said print function from the operating system;
reading, at said driver software, data reflecting the selected electronic document from a random-access-memory;
directing, at said driver software, data reflecting the selected electronic document to the operating system for a physical redirection to said e-book server, via said private network;
activating said emulation software, when said driver software returns to a stand-by (idle) mode;
receiving, at said emulation software, data reflecting the selected electronic document from said driver software, via the operating system;
converting, at said emulation software, data reflecting the selected electronic document into an e-book format and reformatting the data for said remote e-book terminal; and
transmitting, at said emulation software, reformatted data reflecting the selected electronic document to the operating system for said physical redirection to said e-book server, via said private network.

9. The system as claimed in claim 2, wherein said private network corresponds to a local area network (LAN), and wherein said public network corresponds to one of a plain old telephone service (POTS), a public switched telephone network (PSTN), an integrated services digital network (ISDN), a mobile network, a satellite network, an Internet, a terrestrial digital TV network, a cellular network, and a short-range radio (Bluetooth, Home RF protocol, wireless LAN) network.

10. The system as claimed in claim 2, wherein said e-book terminal for use to download or request automatic delivery of a selected electronic document stored in said e-book format at said e-book server comprises:
an electronic module which provides a central processing unit (CPU) to control all operations of said e-book terminal under instructions of the operating system, a BIOS read-only-memory (ROM), and a random-access-memory (RAM) which provides the primary memory space to write, store and retrieve information and program instructions used by the CPU;

a display and a display controller which support a visual display of the selected electronic document on a display screen;

a power unit which provides power supply to said e-book terminal;

an updatable read-only-memory (ROM) which supports additional memory capacity;

a communication interface which supports communications with said e-book server via said public network; and a security unit which provides overall security to said e-book terminal.

11. The system as claimed in claim 1, wherein said selected electronic document is printed from said host computer under instructions from a user for delivery to said e-book server over said private network for later downloading, via said public network, to said remote e-book terminal.

12. The system as claimed in claim 1, wherein said selected electronic document is printed from said host computer under instructions from a user for delivery to said e-book server over said private network and an Internet for later downloading, via said Internet, to said remote e-book terminal.

13. An electronic book (e-book) system, comprising:

a private network;

a central server connected to said private network, which stores a collection of electronic documents;

a docking station connected to said private network, which supports an e-book terminal to receive an electronic document selected from said central server converted in an e-book format for later viewing off-line; and a computer connected to said private network, which selects the electronic document from said central server, and uses a print function of an operating system to transfer the selected electronic document from said central server in an e-book format to said docking station for downloading into said e-book terminal for later viewing off-line.

14. The system as claimed in claim 13, wherein said computer comprises an e-book driver software to provide an interface with said operating system and to direct the selected electronic document to said docking station for downloading into said e-book terminal, and an emulation software to emulate said e-book terminal as a token network printer in said private network.

15. The system as claimed in claim 14, wherein said e-book driver software is installed at said computer using an Add Printer Wizard provided by the operating system for setting up said e-book terminal as a token network printer in said private network to print from the operating system of said computer.

16. The system as claimed in claim 14, wherein said emulation software is installed at said computer to emulate said e-book terminal as a token network printer in said private network, and includes a conversion subroutine for converting data reflecting the selected electronic document into an e-book format for downloading into said e-book terminal.

17. The system as claimed in claim 14, wherein said e-book driver software and said emulation software are embodied on any of a variety of computer readable media for use with said computer.

18. The system as claimed in claim 14, wherein said emulation software installed at said computer emulates said e-book terminal as a token network printer and then converts the selected electronic document into an e-book format, via said conversion subroutine, before a physical redirection to said docking station for downloading into said e-book terminal over said private network.

19. The system as claimed in claim 14, wherein said e-book driver software and said emulation software installed at said computer interacts with the operating system to transfer the selected electronic document to said docking station for downloading into said e-book terminal, via said private network, according to the following steps:

activating said driver software, when a user selects said print function from the operating system;

reading, at said driver software, data reflecting the selected electronic document from a random-access-memory;

directing, at said driver software, data reflecting the selected electronic document to the operating system for a physical redirection to said e-book server, via said private network;

activating said emulation software, when said driver software returns to a stand-by (idle) mode;

receiving, at said emulation software, data reflecting the selected electronic document from said driver software, via the operating system;

converting, at said emulation software, data reflecting the selected electronic document into an e-book format and reformatting the data for said e-book terminal; and transmitting, at said emulation software, reformatted data reflecting the selected electronic document to the operating system for said physical redirection to said docking station for downloading into said e-book terminal, via said private network.

20. The system as claimed in claim 14, wherein said private network corresponds to a local area network (LAN).

21. An electronic book (e-book) system, comprising:

a first network;

a second network different from said first network;

a remote e-book terminal;

a host computer;

a central server connected to said first network, which stores a collection of electronic documents; and an e-book server which stores an electronic document selected from said central server converted in an e-book format for later downloading to said remote e-book terminal, via said second network;

wherein said host computer connected to first network, and having an e-book driver software installed therein to provide an interface with an operating system (OS) and to direct a selected electronic document from said central server to said e-book server, and an emulation software installed therein to emulate said e-book server as a token network printer in said first network, when a print function of the operating system (OS) is activated to transfer the selected electronic document from said central server for storage in an e-book format at said e-book server for later downloading to said remote e-book terminal, via said second network.

22. The system as claimed in claim 21, wherein said first network is a private network connecting said host computer, said central server, and said e-book server, and wherein said second network is a public network connecting said e-book server and said remote e-book terminal.

23. The system as claimed in claim 22, wherein said e-book driver software is installed at said host computer using an Add Printer Wizard provided by the operating system (OS) for setting up said e-book server as a token network printer in said private network to print from the operating system (OS) of said host computer.

24. The system as claimed in claim 22, wherein said emulation software is also installed in said e-book server to emulate said e-book server as a token network printer in said private network, and includes a conversion subroutine for converting data reflecting the selected electronic document into an e-book format for storage at said e-book server.

25. The system as claimed in claim 22, wherein said e-book driver software and said emulation software are embodied on any of a variety of computer readable media for use with said host computer.

26. The system as claimed in claim 22, wherein said emulation software installed in said host computer emulates said e-book server as a token network printer and then converts the selected electronic document into an e-book format, via said conversion subroutine, before a physical redirection to said e-book server over said private network.

27. The system as claimed in claim 22, wherein said e-book driver software and said emulation software installed in said host computer interacts with the operating system (OS) to transfer the selected electronic document to said e-book server, via said private network, according to the following steps:

activating said driver software, when a user selects said print function from the operating system (OS);

reading, at said driver software, data reflecting the selected electronic document from a random-access-memory (RAM);

directing, at said driver software, data reflecting the selected electronic document to the operating system (OS) for a physical redirection to said e-book server, via said private network;

activating said emulation software, when said driver software returns to a stand-by (idle) mode;

receiving, at said emulation software, data reflecting the selected electronic document from said driver software, via the operating system (OS);

converting, at said emulation software, data reflecting the selected electronic document into an e-book format and reformatting the data for said remote e-book terminal; and transmitting, at said emulation software, reformatted data reflecting the selected electronic document to the operating system (OS) for said physical redirection to said e-book server, via said private network.

28. The system as claimed in claim 22, wherein said e-book terminal for use to download or request automatic delivery of a selected electronic document stored in said e-book format at said e-book server comprises:

an electronic module which provides a central processing unit (CPU) to control all operations of said e-book terminal under instructions of the operating system, a BIOS read-only-memory (ROM), and a random-access-memory (RAM) which provides the primary memory space to write, store and retrieve information and program instructions used by the CPU;

a display and a display controller which support a visual display of the selected electronic document on a display screen;

a power unit which provides power supply to said e-book terminal;

an updatable read-only-memory (ROM) which supports additional memory capacity;

a communication interface which supports communications with said e-book server via said public network; and a security unit which provides overall security to said e-book terminal.

* * * * *